(12) United States Patent
Cloran

(10) Patent No.: US 8,484,042 B2
(45) Date of Patent: Jul. 9, 2013

(54) APPARATUS AND METHOD FOR PROCESSING SERVICE INTERACTIONS

(71) Applicant: Interactions Corporation, Franklin, MA (US)

(72) Inventor: Michael Eric Cloran, Lawrenceville, NJ (US)

(73) Assignee: Interactions Corporation, Franklin, MA (US)

( * ) Notice: Subject to any disclaimer, the term of this patent is extended or adjusted under 35 U.S.C. 154(b) by 0 days.

(21) Appl. No.: 13/708,264

(22) Filed: Dec. 7, 2012

(65) Prior Publication Data

US 2013/0096924 A1    Apr. 18, 2013

Related U.S. Application Data

(63) Continuation of application No. 12/551,864, filed on Sep. 1, 2009, now Pat. No. 8,332,231, which is a continuation of application No. 10/839,536, filed on May 5, 2004, now Pat. No. 7,606,718.

(60) Provisional application No. 60/467,935, filed on May 5, 2003.

(51) Int. Cl.
*G06Q 10/06* (2012.01)

(52) U.S. Cl.
USPC ............................................. 705/1.1; 705/301

(58) Field of Classification Search
USPC .................................................. 705/1.1, 301
See application file for complete search history.

(56) References Cited

U.S. PATENT DOCUMENTS

| | | | |
|---|---|---|---|
| 2002/0152071 A1* | 10/2002 | Chaiken et al. | 704/251 |
| 2003/0110023 A1* | 6/2003 | Bangalore et al. | 704/5 |
| 2004/0093257 A1* | 5/2004 | Rogers et al. | 705/10 |

OTHER PUBLICATIONS

Anonymous. "Let your voice do the walking". Call Center Magazine. 15.11 (Nov. 2002): 28-40.*

* cited by examiner

*Primary Examiner* — Gabrielle McCormick
(74) *Attorney, Agent, or Firm* — Fenwick & West LLP

(57) ABSTRACT

An interactive voice and data response system that directs input to a voice, text, and web-capable software-based router, which is able to intelligently respond to the input by drawing on a combination of human agents, advanced speech recognition and expert systems, connected to the router via a TCP/IP network. The digitized input is broken down into components so that the customer interaction is managed as a series of small tasks performed by a pool of human agents, rather than one ongoing conversation between the customer and a single agent. The router manages the interactions and keeps pace with a real-time conversation. The system utilizes both speech recognition and human intelligence for purposes of interpreting customer utterances or customer text, where the role of the human agent(s) is to input the intent of caller utterances, and where the computer system—not the human agent—determines which response to provide given the customer's stated intent (as interpreted/captured by the human agents). The system may use more than one human agent, or both human agents and speech recognition software, to interpret simultaneously the same component for error-checking and interpretation accuracy.

17 Claims, 9 Drawing Sheets

| Screen 1 | |
|---|---|
| Customer Utterance: | <none> |
| Intent Captured: | <none> |
| Data Captured: | <none> |
| Pre-Recorded System Prompt or Response: | "Thank you for calling Interair! Im the new automated assistant. Just talk to me like you would to a person. How can I help you?" |

Figure 3A

| Screen 2 | |
|---|---|
| Customer Utterance: | "I need to check my flight from Chicago to London this afternoon" |
| Intent Captured: | CFT |
| Data Captured: | Departure City: Chicago<br>Arrival City: London<br>Departure Time: Afternoon |
| Pre-Recorded System Prompt or Response: | "Flight # 921 is scheduled to depart on time at 5:15 P.M. from Chicago OHare gate M17A and arrive on time at London Heathrow at 8:15 A.M. at gate E7."<br>"How else can I help you today?" |

Figure 4A

| Screen 3 | |
|---|---|
| Customer Utterance: | "Yeah, is there any food and how about some entertainment?" |
| Intent Captured: | Meal<br>Movie |
| Data Captured: | <none> |
| Pre-Recorded System Prompt or Response: | "A meal will be served during this flight."<br>"The movie Seabiscuit will be shown during your flight."<br>"What else can I do for you?" |

Figure 5A

APPARATUS AND METHOD FOR PROCESSING SERVICE INTERACTIONS

RELATED APPLICATIONS

This application claims priority to U.S. Provisional Application No. 60/467,935, filed May 3, 2003, and is a continuation of U.S. patent application Ser. No. 10/839,536, entitled "APPARATUS AND METHOD FOR PROCESSING SERVICE INTERACTIONS" and filed on May 5, 2004, pending.

FIELD

This invention relates to the field of interactive response communication systems, and, more particularly to an interactive response communications system that use human interpretation of customer intent as input to a workflow on a computer.

BACKGROUND

Many companies interact with their customers via electronic means (most commonly via telephone, e-mail, and online text chat). Such electronic systems save the companies a large amount of money by limiting the number of customer service or support agents needed. These electronic systems, however, generally provide a less than satisfactory customer experience. The customer experience may be acceptable for simple transactions, but are frequently inconsistent or downright frustrating if the customer is not adept at talking to or interacting with a computer.

Such interactive response systems are well known in the art. For example, providing customer service via telephone using an interactive voice response (IVR) system is one such system. An example of customer service systems utilizing IVR technology is described in U.S. Pat. No. 6,411,686. An IVR system typically communicates with customers using a set of prerecorded phrases, responds to some spoken input and touch-tone signals, and can route or transfer calls. A drawback to such IVR systems is that they are normally built around a "menu" structure, which presents callers with just a few valid options at a time and require a narrow range of responses from callers.

Many of these IVR systems now incorporate speech recognition technology. An example of a system incorporating speech recognition technology is described in U.S. Pat. No. 6,499,013. The robustness of the speech recognition technology used by IVR systems vary, but at present all have a predetermined range of responses that they listen for and can understand, which limits the ability of the end user to interact with the system in everyday language. Therefore, the caller will often feel that they are being forced to speak to the system "as though they are talking to a computer." Moreover, even when interacting with a system that utilizes speech recognition, customer input is often either not recognized or incorrectly determined, causing the customer to seek a connection to a human customer service agent as soon as possible.

Human customer service agents continue to be used for more involved customer service requests. These agents may speak to the customer over the phone, respond to customer e-mails, and chat with customers online. Agents normally answer customer questions or respond to customer requests. Companies have customer service groups, which are sometimes outsourced to businesses that specialize in "customer relations management." Such businesses run centers staffed by hundreds of agents who spend their entire working day on the phone or otherwise interacting with customers. An example of such system is described in U.S. Pat. No. 5,987,116.

The typical model of customer service interaction is for one agent to assist a customer for the duration of the customer's interaction. At times, one agent (for example, a technical support representative) may transfer the customer to another agent (such as a sales representative) if the customer needs help with multiple requests. But in general, one agent spends his or her time assisting that one customer for the full duration of the customer's call or chat session, or is occupied resolving the customer's issues via e-mail. Most call centers also expect the agent to take the time to log (document) the call. Deficiencies in this heavy agent interface model is (1) there is a high agent turnover rate and (2) a great deal of initial and ongoing agent training is usually required, which all add up to making customer service a significant expense for these customer service providers.

In order to alleviate some of the expenses associated with agents, some organizations outsource their customer service needs. One trend in the United States in recent years, as high-speed fiber optic voice and data networks have proliferated, is to locate customer service centers overseas to take advantage of lower labor costs. Such outsourcing requires that the overseas customer service agents be fluent in English. In cases where these agents are used for telephone-based support, the agent's ability to understand and speak clearly in English is often an issue. An unfortunate result of off-shore outsourcing is misunderstanding and a less than satisfactory customer service experience for the person seeking service.

Therefore, there is a need in the art for an interactive system that provides a consistently high-quality experience without the expense of a large staff of dedicated, highly trained agents.

SUMMARY

It is therefore an object to provide an interactive response system with interactions portioning. That is, human agent would be able to interact intermittently through a customer call by hearing only those portions of the call requiring his or her interpretation so no one customer service agent is tied to the customer's conversation for its full duration.

It is an additional object of some embodiments to provide an interactive response system with multiple-agent checking so that a customer's intent, input (data) or both, is accurately determined. Using double, triple or more checking, more than one human agent evaluates and chooses an interpretation for an instance of customer input, thus improving accuracy of the call and providing an objective measure of each human agent's speed and accuracy.

It is also an object of some embodiments to provide an interactive response system with agent portability so that customer service agents can be located nearly anywhere in the world. If a human agent is needed to interpret intent, data, or both, one, or advantageously two or more, agents hear or see only the component of the interaction need to be interpreted or translated into a context that the interactive response system understands. The interactive response system handles outgoing communication to the end user, including speaking (using text-to-speech or professionally recorded clips) so the human agent's voice would never be heard by the customer, eliminating any concern of an agent's accent. The actual interaction with the customer is managed by a software-based router whose front end is email, interactive data or speech capable.

It is a further object of some embodiments to provide an interactive response system in which the customer can speak in a conversational tone instead of responding as if "speaking to a computer." A router in accordance with some embodiments of this disclosure seamlessly blends both human customer service agents (for interpretation of written or spoken input) and software speech recognition (for spoken word input) to interpret customer input in real-time for intelligent interpretation.

It is an event further object of some embodiments to provide an interactive response system that allows for simplified human agent training and evaluation. This system provides the ability for multiple agents to evaluate the same component of customer input simultaneously. Further, this system provides a means to objectively rate the speed and accuracy of an agent's response to input, which greatly simplifies the hiring and training process. New agents can act in the customer service agent role without their response being weighted by the router, but the agent can still receive feedback on their performance. An objective performance measure then exists to decide when to promote a new hire from trainee status. In addition, all responses to customers used by the system are scripted and engineered, removing the huge requirements of training customer service agents in how to speak to customers.

It is another object of some embodiments to provide an interactive response system that allows for workload balancing by dynamically adjusting the number of agents assigned to each component of customer interaction for purposes of multiple agent checking. For example, in times of heavier end-user traffic, the system advantageously evaluates and executes a tradeoff between agent accuracy and availability. To effect such balancing, some components of customer input are single-checked by the most accurate agents—thereby maintaining 100% availability of the system. At times of lower traffic, accuracy is increased through triple or quadruple checking, which also creates a steady pace of work for human agents. Being able to ramp up availability without severely degrading accuracy is a significant enhancement over current call center models.

It is yet another object of some embodiments to provide an interactive response system that provides speech acceleration to enable faster customer service and response time. Acceleration applied to audio being streamed across a TCP/IP network to help overcome delays introduced by application setup times.

It is even yet another object of some embodiments to provide an interactive response system with interaction control such that interactive steps with customers are determined by choices in a workflow. Advantageously, workflows are updated any time by business analysts, process engineer, or company appointed personnel.

It is a still further object of some embodiments to provide an interactive response system with end user security so that customer confidential data is kept secure. Workflows may be advantageously designed so that the automated portion of the system can handle tasks involving sensitive data such as social security numbers, credit cards, etc., whereby the human agents never have access to this data. Even if a workflow requires that customer service agents do handle sensitive data, the workflow may be engineered to distribute the components of the input in a manner such that no one agent handles the whole of the customer data. For example, one agent might see or hear a full customer name, while another has access to the customer's social security number, and neither learns the customer's home address.

These and other objects are accomplished in various forms and embodiments in accordance with the various principles described herein by providing an interactive response system that uses human agents to interpret and input customer intent from customer utterances or written text. This embodiment provides a system and method of blending human interpretation, speech recognition technology, text parsing and lexical analysis, text-to-speech capabilities and other resources in a system for the automated processing of customer-company interactions.

The exemplary system discussed in the present disclosure is a solution for customer relations management. The central element of the system is a software-based router that manages the conversation with the end user either in real-time (voice, online text chats) or correspondence (e-mail). The router follows rules (herein called "workflows") developed and tweaked over time by business analysts. These rules form a script for the router to follow when interacting with end users. The router draws on both text-to-speech capabilities and pre-recorded responses when replying to an end user. For interpretation of user utterances, the router employs both speech recognition technology and the interpretive abilities of human customer service agents, seamlessly blending the two. This blending can be performed in real-time or near real-time to allow the router to carry on a conversation-like interaction with an end user. The incorporation of human interpretation of user utterances or written text allows the router to use open-ended, conversational prompts, and to respond in context to user input that software might find ambiguous. Users are thus able to interact with the system using everyday language, and are not forced into a narrow range of responses.

The exemplary system integrates human agents in an innovative way. Because user input is digitized, the router can direct only those portions of the input that require human interpretation to human agents. No one customer service agent is tied to a customer conversation for its entire duration; the interaction is managed by the router itself. Also, the router is able to send the digitized input to more than one human agent for simultaneous interpretation, which provides double and triple checking of each answer from the agents. Such double and triple check also provides an objective measure and ranking of the speed and accuracy of the agents. The system is designed to work over a TCP/IP network, so that the customer service agents can be located virtually anywhere in the world. Advantageously, the system comprises off-the-shelf hardware and software, some customized software (as noted below), and can be integrated with existing company resources, such as databases and telephone networks.

BRIEF DESCRIPTION OF THE DRAWINGS

Further features, the nature of various embodiments of the system, and various advantages will be more apparent from the following detailed description of the preferred embodiment, taken in conjunction with the accompanying drawings, in which like reference characters refer to like parts throughout, and in which:

FIG. 3A is a chart illustrating one embodiment of a customer/interactive response system interaction in the context of FIG. 2;

FIG. 4A is a chart illustrating one embodiment of a customer/interactive response system interaction in the context of FIG. 2;

FIG. 5A is a chart illustrating one embodiment of a customer/interactive response system interaction in the context of FIG. 2;

DESCRIPTION

Figure 1:
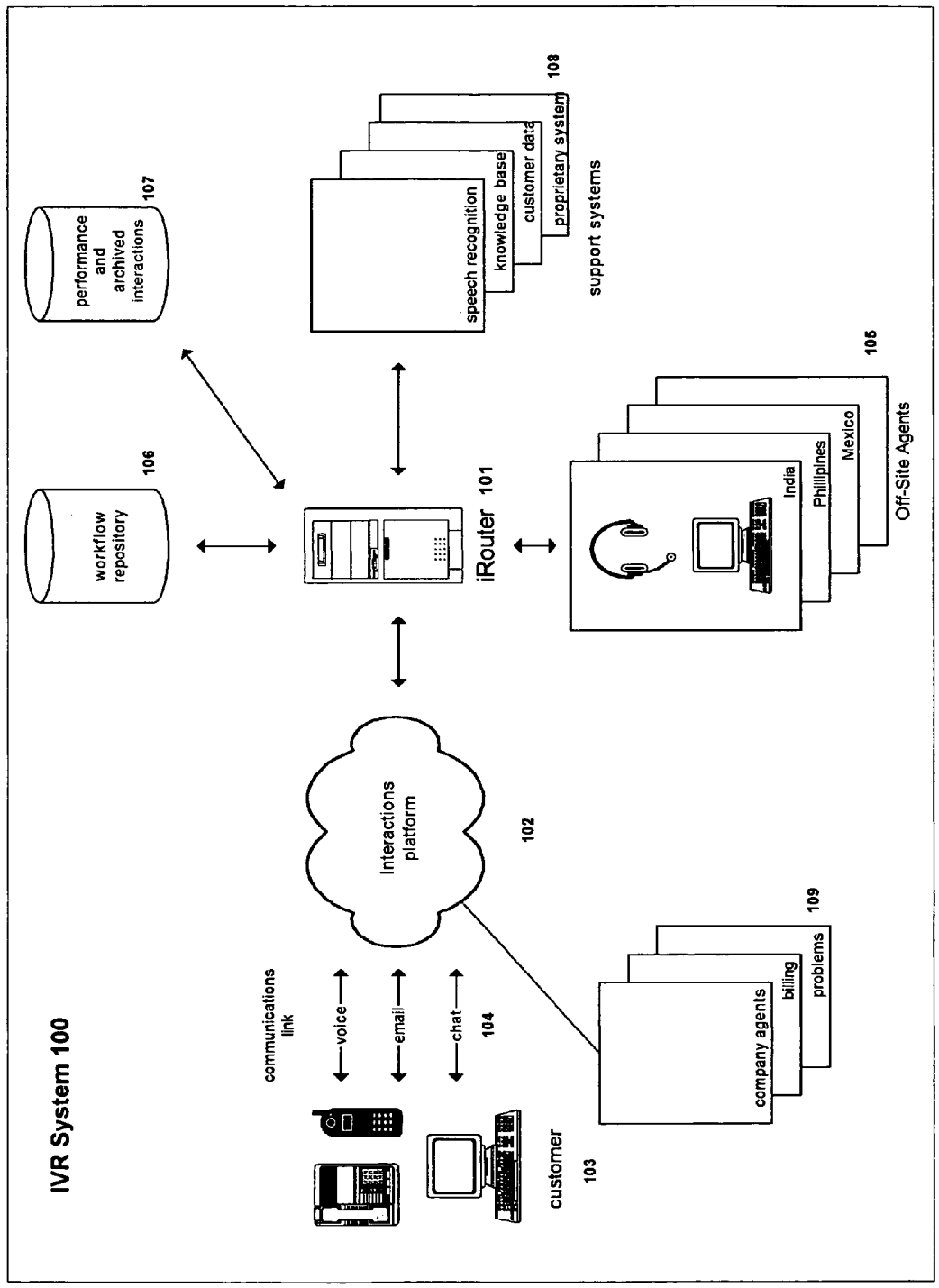
FIG. 1 is a block diagram illustrating one embodiment of an architecture of an interactive response system according to an exemplary embodiment.

FIG. 1 illustrates one embodiment of an architecture for connecting an interactions platform 102 to an interactive response system 100 through an interactive router 101 (herein referred to as an "iRouter"). As shown in FIG. 1, interactions platform 102 is connected to a customer 103 through communications link 104. Interactions platform 102 is also connected to interactive response system 100 at iRouter 101 via a data link, which comprises a TCP/IP data link in this exemplary embodiment. Interactions platform 102 in this exemplary embodiment comprises a computer server. The exact configuration of the computer server varies with the implementation but typically consists of a Pentium-based server running an operating system such as Windows XP Professional or Linux, using a voice board from a vendor such as Dialogic. Interactions platform 102 can also be an e-mail gateway or web server. Thus, customer input enters interactive response system 100 via telephone or intercom and text is entered via email or an interactive chatting interface (e.g., a web page or a stand-alone application such as AOL Instant Messenger).

In this architecture of FIG. 1, a number of different types of devices can be used to implement each of the interactions platform 102 and communications links 104. Interactions platform 102 may be implemented by any device capable of communicating with the customer 103. For example, interactions platform 102 may be a telephony server in interactive response system 100 where the customer is calling by telephone. The telephony server handles answering, transferring and disconnecting incoming calls. The telephony server is also a storehouse for prerecorded audio clips so that it can play any welcome prompt and as other audio clips as directed by iRouter 101.

A telephony server in accordance with this embodiment is assembled from off-the-shelf components, for example Windows XP Professional for an operating system, a central processor, such as a Pentium processor, and an Intel Dialogic voice board. Using this architecture, the communications link 104 may be implemented by any means of providing an interface between the customer's telephone and the telephony server. For example, communications link 104 may be a dial-up connection or a two-way wireless communication link.

In another exemplary embodiment, interactions platform 102 may be a gateway server in interactive response systems 100. In accordance with this exemplary embodiment, the customer interacts with the interactive response server by e-mail or by interactive text chats. The gateway server runs customized open source e-mail or www server software. Further, a gateway server in accordance with this exemplary embodiment is designed to conduct e-mail and interactive text chat transactions with customers, while also forwarding and receiving data to other elements of the system. Using this architecture, the communications link 104 may be implemented by any means of providing an interface between the customer's computer and the gateway server. For example, communications link 104 may be a dedicated interface, a single network, a combination of networks, a dial-up connection or a cable modem.

While only one interactions platform 102 is illustrated in FIG. 1, one skilled in the art will appreciate that multiple interactions platforms 102 may be used in this system after studying this specification. With multiple interactions platforms 102, an interactive response system may communicate via voice and text data with a customer. Further, multiple customer bases may be accommodated by a dedicated interactions platform 102 for each of the customer bases. In this manner, a workflow (as will be described further, below) can be selected by determining which of the multiple interactions platforms 102 initiated the interaction.

In the architecture of FIG. 1, the iRouter 101 comprises software to control interactive response system 100. iRouter 101 "owns" the interaction with customer 103 from beginning to end by coordinating activity among other components and managing the transaction. iRouter 101 manages interactions with customer 103 according to one or more programmable scripts, called, according to this exemplary embodiment, "workflows." In general, a workflow comprises an interaction flow wherein the path through the workflow depends upon intent input from the customer. Workflows are preprogrammed by system engineers and, advantageously, periodically "tweaked" in order to improve customer satisfaction, speed, accuracy, etc. In accordance with this exemplary embodiment, iRouter 101 is almost always "in charge" of selecting the next step or path in the workflow.

iRouter 101 receives interaction input from interactions platform 102 in the form of audio clips, email, text data or other interaction type—depending on the form of customer communication—and forwards the input to one or more human agents 105, speech recognition engines or expert systems (collectively 108) and uses the responses to advance its current workflow. When human interpretation (or translation) of the input is necessary, iRouter 101 directs human agent desktop software to display an appropriate visual context of the current workflow. Once iRouter 101 understands the input, iRouter 101 advances through the workflow and directs interactions platform 102 to respond appropriately to customer 103.

In an exemplary embodiment wherein interactions platform 102 comprises a telephony server, iRouter 101 may deliver sound clips to play back to a customer, send text-to-speech clips or both. Alternatively, interactions platform 102 may store sound clips, have text-to-speech capability or both. In this embodiment, iRouter directs interactions platform 102 as to what to play to a customer and when.

iRouter 101 comprises, in this exemplary embodiment, a networked, off-the-shelf commercially available processor running an operating system such as Windows XP or Linux. Further, iRouter 101 software includes a modified open VXML browser and voice XML script incorporating objects appropriate to the specific application. One skilled in the art will understand how to construct these objects after studying this specification.

Figure 3B:
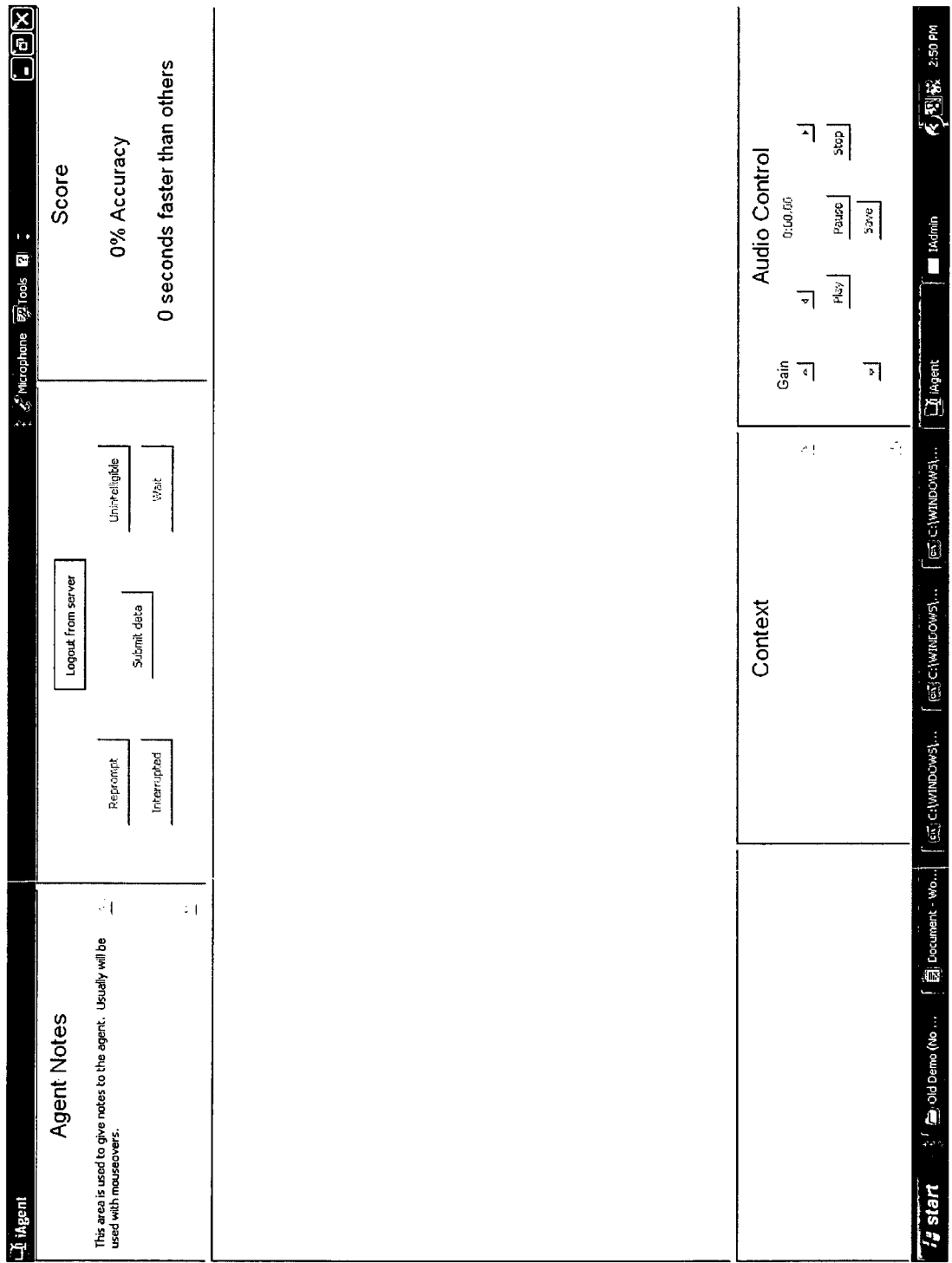
FIG. 3B is a computer screen illustrating one embodiment for capturing customer intent and data in the context of FIG. 2.

In accordance with the exemplary architecture of FIG. 1, interactive response system 100 includes at least one pool of human agents 105. A pool of human agents 105 is often located at a contact center site. Human agents 105, in accordance with the present embodiment, use specialized desktop software specific to system 100 (as will be described further, below, in connection with FIGS. 3B, 4B and 5B) that presents a collection of possible intents on their screen—along with a history or context of the customer interaction to that point. The human agent or agents 105 interpret the input and select an appropriate customer intent, data or both.

For telephone interactions, human agents 105 wear headphones and hear sound clips streamed from the telephony server 102 at the direction of iRouter 101. In accordance with one aspect of this system, a single human agent 105 will not handle the entire transaction for customer 103. Rather, human agent 105 handles some piece of the transaction that has been designated by the workflow designer as requiring human interpretation of customer's 103 utterance. iRouter 101 can send the same customer 103 interaction to any number of human agents 105, and may distribute pieces of a given interaction to many different human agents 105.

In accordance with the exemplary embodiment of this system, human agents 105 are preferably off-side. Further, human agents 105 may be in diverse geographic areas of the world, such as India, the Philippines and Mexico. Human agents 105 may be in groups in a building or may be working from home. In applications that require 24/7 human agent support, human agents may be disposed around the world so that each human agent may work during suitable business hours.

Interactive response system 100 employs custom human agent application software. Human agents 105 use a custom application developed in Java and running on a standard call center computer network workstation. Generally speaking, interactive response system 100 applies human intelligence towards interpretation of customer 103 input into "intent" (what the customer wants) and data (any input required to determine what the customer wants). The interpretation normally comprises selecting the most-correct interpretation of what was said from a list of choices, in this exemplary embodiment.

Workflow server 106, an off-the-shelf component, is an archive of the workflows used by the Interactions router. Workflow server 106 can be built with off-the-shelf hardware using a commercially available processor running a standard server operating system, with the workflow documents written in XML in this exemplary embodiment. Workflow server 106 maintains a compilation of business rules that govern the behavior of iRouter 101.

Interactive response system 100 employs a workflow designer used by a business analyst or process engineer to may out workflows. A workflow serves as the map that iRouter 100 follows in a given interaction, with speech recognition or human agents. The workflow "steers" iRouter 100 along a path in the workflow in response to customer input. A place in the workflow, along with data collected to that point is called a "context."

The workflow designer builds instructions for human agent 105 into the workflow in order to guide human agent 105 in interpreting intent. The workflow designer may include a version of Eclipse software development environment customized to focus on building XML documents. However, one skilled in the art will be able to develop a workflow designer after studying this specification.

Performance and interactions archive 107 comprises a database that can be maintained on any common computer server hardware. Performance and interactions archive 107 contains both archival data of system transactions with customers 103 (i.e., a repository of sound clips, e-mails, chats, etc. from interactions with customer 103) as well as performance data for human agents 105.

This exemplary embodiment employs "reporter" software to generate statistics about a group of interactions or to display performance ranking for human agent 105. Reporter software can also reconstruct an interaction with customer 103 from sound clips, e-mails, or chat text that constituted customer's 103 contact stored in interactions archive 107. Reporter software is a series of simple scripts, and can run on any common server hardware.

This exemplary embodiment also comprises manager/administrator software, usually run from the same station as reporter software. Manager/administrator software sets operating parameters for interactive response system 100. Such operating parameters include, but are not limited to, business rules for load balancing, uploading changes in workflow, and other administrative changes. Manager/administrator software is often a small custom Java application running on a standard call center computer workstation.

Support system 108 consists of numerous databases and customer proprietary systems (also including off-the-shelf speech recognition software such as Speechworks) that may be employed in responding to customer 103 requests. For example, support system 108 may include a database for customer information or a knowledge base. Speech recognition software is, in this exemplary embodiment, an off-the-shelf component used to interpret customer 103 utterances. Support system 108 may also include a text-to-speech capability, often off-the-shelf software that reads text to customer 103.

Company agents 109 consist of human agents that handle customer 103 requests that the workflow refers to them. For example, should customer 103 intend to obtain assistance with a company matter, and an outsourced human agent 105 identifies that intent, the workflow may direct interactive response system 100 to transfer the call to company agent 109.

The elements of interactive response system 100 communicate over a TCP/IP network in this exemplary embodiment. Communication is driven by the workflow that iRouter 101 follows. "Database" in the present embodiment can be a flat file database, a relational database, an object database, or some combination thereof.

"Server" and "workstation" refer to any general purpose computer system which is programmable using a computer programming language, such as C++, Java, or other language, such as a scripting language or assembly language. These computer systems may also include specially programmed, special purpose hardware, for example Intel Dialogic voice boards.

The system is not limited to a particular computer platform, particular processor, particular operating system, or particular high-level programming language. Additionally, the computer system may be a multiprocessor computer system or may include multiple computers connected over a computer network. The system is also not limited to any particular implementation using software or hardware or firmware, or any combination thereof.

Turning now to FIGS. 2 through 5, these figures illustrate an example of how information is retrieved and handled by interactive response system 100 when a customer interacts with the interactive response system 100 via telephone. The example shown in FIG. 2 presupposes that all required hardware, software, networking and system integration is complete, and that a business analyst has mapped out the possible steps in a customer interaction using the graphic workflow designer. The business analyst also has scripted the text for anything that the interactive response system may say to a customer, including, but not limited to, the initial prompt (e.g., "Thank you for calling, how can I help you today?"), response(s) to a customer, requests for additional information, "stutter speech" (sounds sent to the customer while the iRouter is determining a response), and a closing statement. Either text-to-speech software or voice talent records the server-side speech pieces as written by the business analyst. This workflow is then loaded into the interactive response system where it is available to the iRouter.

As shown in block 201, the interaction begins with the customer calling the customer service telephone number of a company. The interactions platform, in this case a telephony server, answers the telephone call and retrieves the appropriate workflow stored in the workflow database, based on either (1) ANI/DNIS information of the caller or (2) other business rules (e.g., line or trunk the call came in on), as illustrated at 202. The telephony server then plays the appropriate welcome prompt as illustrated at 203 and the customer then responds to that prompt (block 204).

For purpose of example, an imaginary airline, Interair, provides customer service via an interactive response system in accordance with a call center embodiment of this system. The interaction platform is therefore a telephony interface, and iRouter selects a workflow appropriate to Interair.

A first point or context in the workflow is shown in the illustrative workflow of FIG. 3A. There is no customer utterance, thus no intent or data to capture (and respond to). The only response is the greeting and the prompt for customer input.

Figure 2:
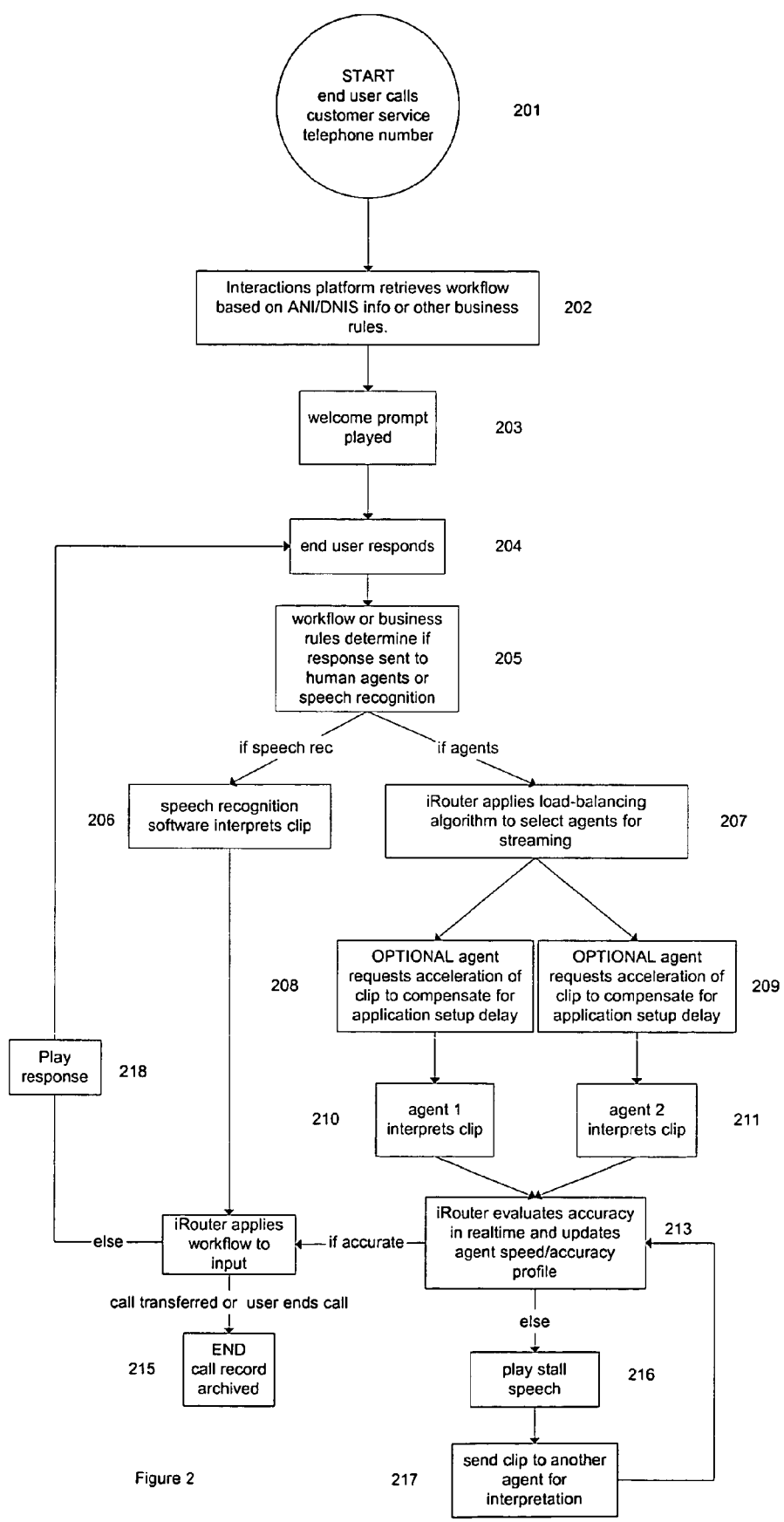
FIG. 2 is a flow chart illustrating an embodiment of a method for communication among a customer, the interactive response system and a human interface.

Processing proceeds to box 204 in the flowchart of FIG. 2. The telephony server begins digitizing the customer's spoken input and connects to the iRouter. At this point, workflow or business rules determine if the interactive response to the customer needs to be handled by a human agent or speech recognition software. That is, the iRouter selects the appropriate workflow for the call from the workflow repository and follows the workflow rules to conduct a conversation with the customer.

To interpret customer speech, iRouter uses software-based speech recognition from the support systems or has the customer's audio streamed to human agents in contact centers as appropriate, as illustrated in block 205. If human agents are required by the workflow, iRouter identifies available human agents by applying a load balancing algorithm, triggers a pop-up on their screens (as illustrated in the initially blank pop-up screen, FIG. 3B), presents several selectable intent options, and begins streaming customer audio to the identified human agents, as shown at block 207. This load balancing, at various times, includes identifying more or fewer human agents for interpreting the utterance based on any of a variety of factors, as will occur to those skilled in the art given the present disclosure. The human agent(s) hear the customer utterance in headphones, and computer software prompts for an interpretation of the utterance as shown in blocks 210 and 211.

Figure 4B:
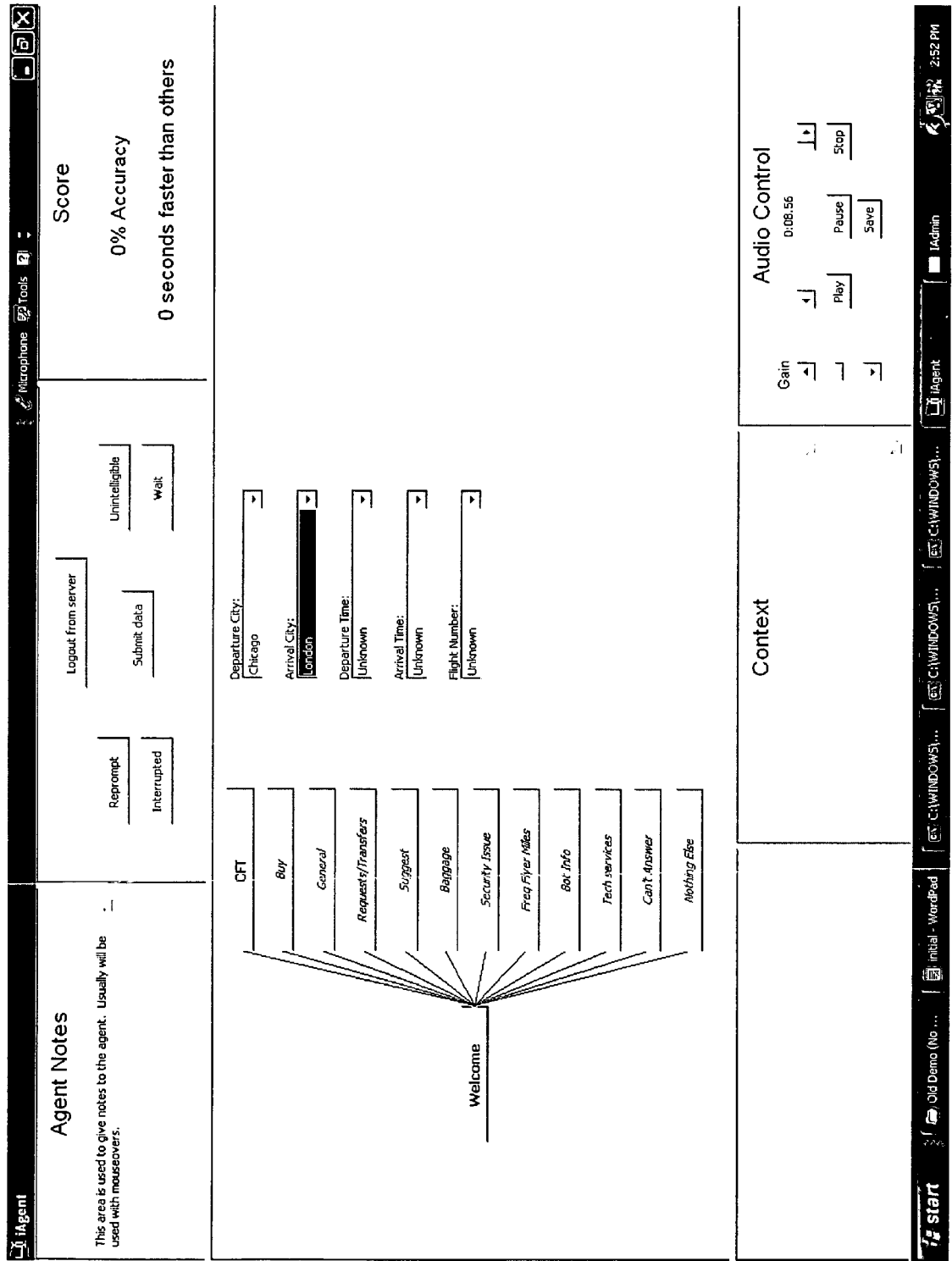
FIG. 4B is a computer screen illustrating one embodiment for capturing customer intent and data in the context of FIG. 2.

In accordance with the exemplary workflow of FIG. 4A, the customer utterance that the human agent or agents hear is "I need to check my flight from Chicago to London this afternoon." The agents' screen indicates the current context (or point in the workflow) as illustrated in FIG. 4B. In this illustrative screen shot, there are 12 possible requests (including unanswerable and terminate) that the human agent can select. In operation, there are several hundred possible interpretations available to the agents. Such multiplicity of selection allows the agents interpretive flexibility, which enables the iRouter to jump around in its workflow according to the interpreted intent. Thus, in accordance with one aspect of this system, the iRouter can respond appropriately even if the customer changes subjects in midstream.

In each case, each agent selects what he or she feels is the best fit interpretation of the customer utterance in the current context of the workflow. In example of FIG. 4B, the human agent(s) selects "CFT" (Check Flight Time) and enters or selects from drop-down menus the departure and arrival cities (or other, preprogrammed information that the customer could possibly utter).

Note that, in blocks 208 and 209, human agents can elect to apply acceleration to the customer audio clip(s) received at the station in order to compensate for any response delay (usually due to lag time in application set-up—the time it will take for human agent desktop software to accept the streaming audio and display the appropriate workflows). Network latency might be around 0.2 seconds, where application delay could be more in the 1+ second range. To compensate for the application delay, the interactive response system accelerates the voice clip (although not to the point of discernible distortion). The purpose is to strive for a more "real-time" conversational interaction, so that the customer does not experience a notable delay while awaiting a response. The acceleration is applied to the speech as it is streaming from the telephony server. The acceleration can never overcome the inherent latency of the link but allows human agents to "recover" the application set-up time and reduce the amount of lag time in the interaction, ideally up to the limits imposed by latency in the network. However, acceleration is optional in this embodiment, wherein a novice agent may need a slower playback, while a more experienced agent may apply acceleration.

In test 213, the iRouter evaluates the accuracy, in real time, of the customer audio interpretation and updates each agent's speed/accuracy profile. Next, in block 214, the iRouter processes the interpretation and performs the next step(s) in the workflow (e.g., database lookup based on input data) and then forwards an appropriate response 218 to the customer through the telephony server if the interpretation is deemed accurate. If the iRouter determines the interpretation is accurate, it directs the playback of responses to the customer from the telephony server based on the interpretation of either the speech recognition software or by applying key algorithms to the responses of one or more human agents. In this example, the response is given to the customer in the last block of screen 2, FIG. 4A.

To determine accuracy, the iRouter compares the interpretation of two human agents and if no consensus is reached, plays the customer audio clip for a third human agent for a further interpretation (i.e., "majority rule" determines which is the accurate response). Other business rules may also be used to determine the accurate interpretation. For example, an interpretation from the agent with the best accuracy score from past interpretation may be selected. Alternatively, one of the interpretations may be selected and played back to the customer ("I understood you to say . . . ") and the customer response determines whether the interpretation was correct. Further, the interpretations may be selected from known data (e.g., two interpretations of an email address could be compared against a database of customer email addresses, only one of two interpretations of a credit card number will pass a checksum algorithm, etc.).

The interactive response system allows for virtually any number of human agents to handle to same customer interaction at once. That is, an interactive response system could have two agents listening during a busy time or have seven human agents listening during a more idle time. Moreover, during times of high call volume, accuracy can be decreasing by removing the "double-checking" rule to maintain high response time. An agent assigned a high trust ranking based on the agent's speed/accuracy profile may be asked to work without the double-checking. In addition to trading off accuracy for quicker system availability, a steady flow of audio clips is kept flowing by each agent, thereby decreasing human agent "slack" time.

Returning to the flowchart of FIG. 2, either the customer will respond again as seen in block 204, the call will be transferred (if so directed by a step in the workflow or by business rules), or the customer terminates the call, as shown in block 215. If the interpretation is deemed inaccurate in block 213, the iRouter plays a stutter speech recording to the customer (block 216) and send the audio clip to additional human agents for another interpretation (block 217) and then reevaluate its accuracy.

The iRouter manages interaction with the customer to call completion, using the workflow as its guide. The iRouter may stream customer utterances to human agents for interpretation at numerous points in the call. Once the call has concluded, a snapshot of the customer interaction is preserved in the archive database. Human agents' speed/accuracy profiles are constantly updated and maintained.

If human intervention is not needed to interpret a customer's request, speech recognition software interprets the audio clip and the iRouter determines the appropriate response as shown in blocks 206 and 214.

Figure 5B:
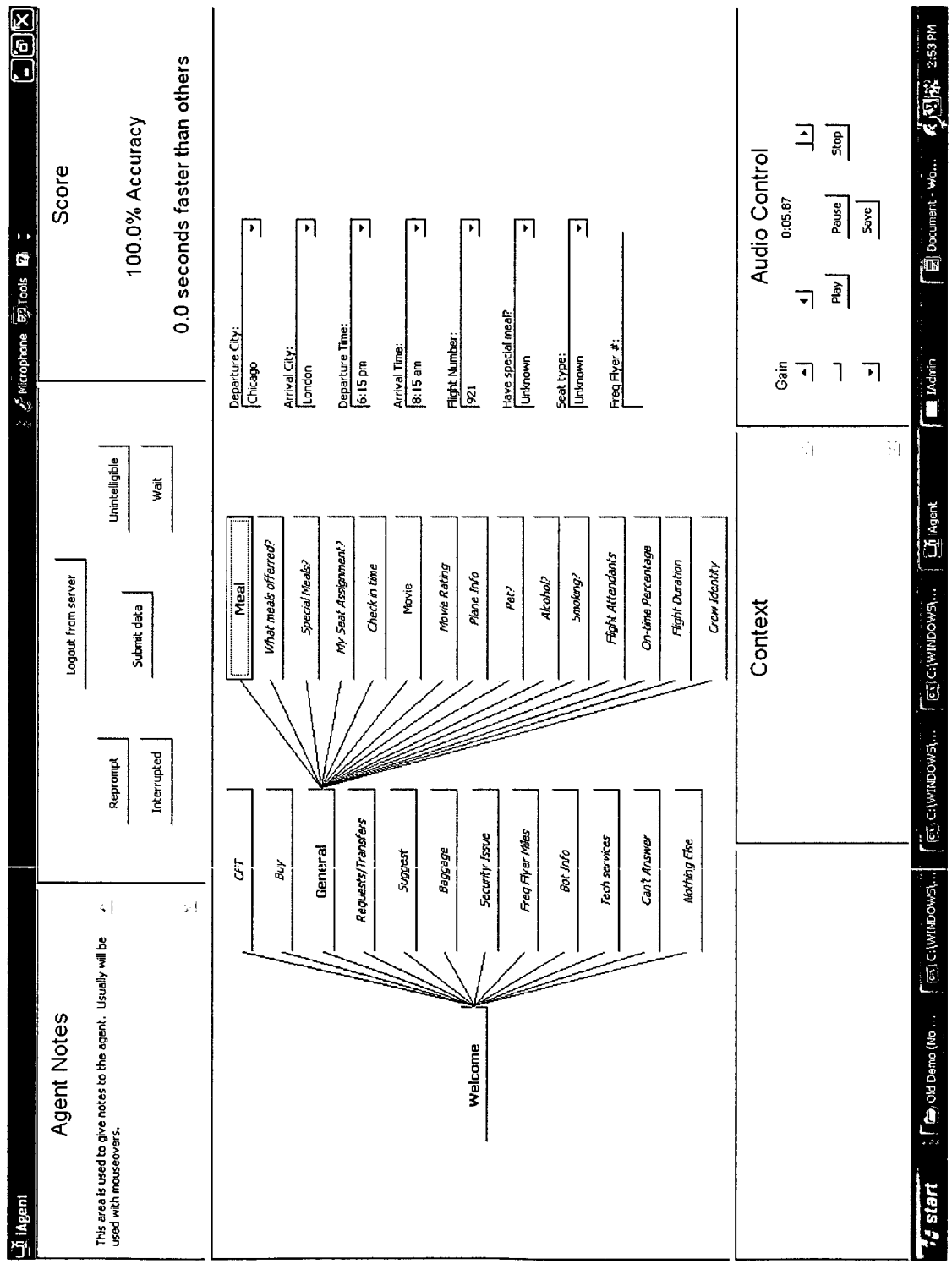
FIG. 5B is a computer screen illustrating one embodiment for capturing customer intent and data in the context of FIG. 2.

Continuing with the Interair example, the captured customer utterance, as seen in FIG. 5A, has two requests: food and entertainment queries. In accordance with another aspect of this system, the human agent captures two intents: meal and movie. There is no relevant data to enter because the interactive response system already knows the flight information from the previous data entered in FIG. 4B (this data is visible in FIG. 5B). As seen in FIG. 5B, the human agent enters "General" and "Meal" from an on-screen display of possible intents. The human agent also enters "Movie." As seen in FIG. 5A, the interactive response system then provides the appropriate response. As seen in FIG. 5B, if the customer requests further information regarding the meal or movie such as: "What meal is offered?", "Are their special meals?", "What is the movie rated?", the appropriate human agent interpretation options are located on the computer screen.

Figure 6:
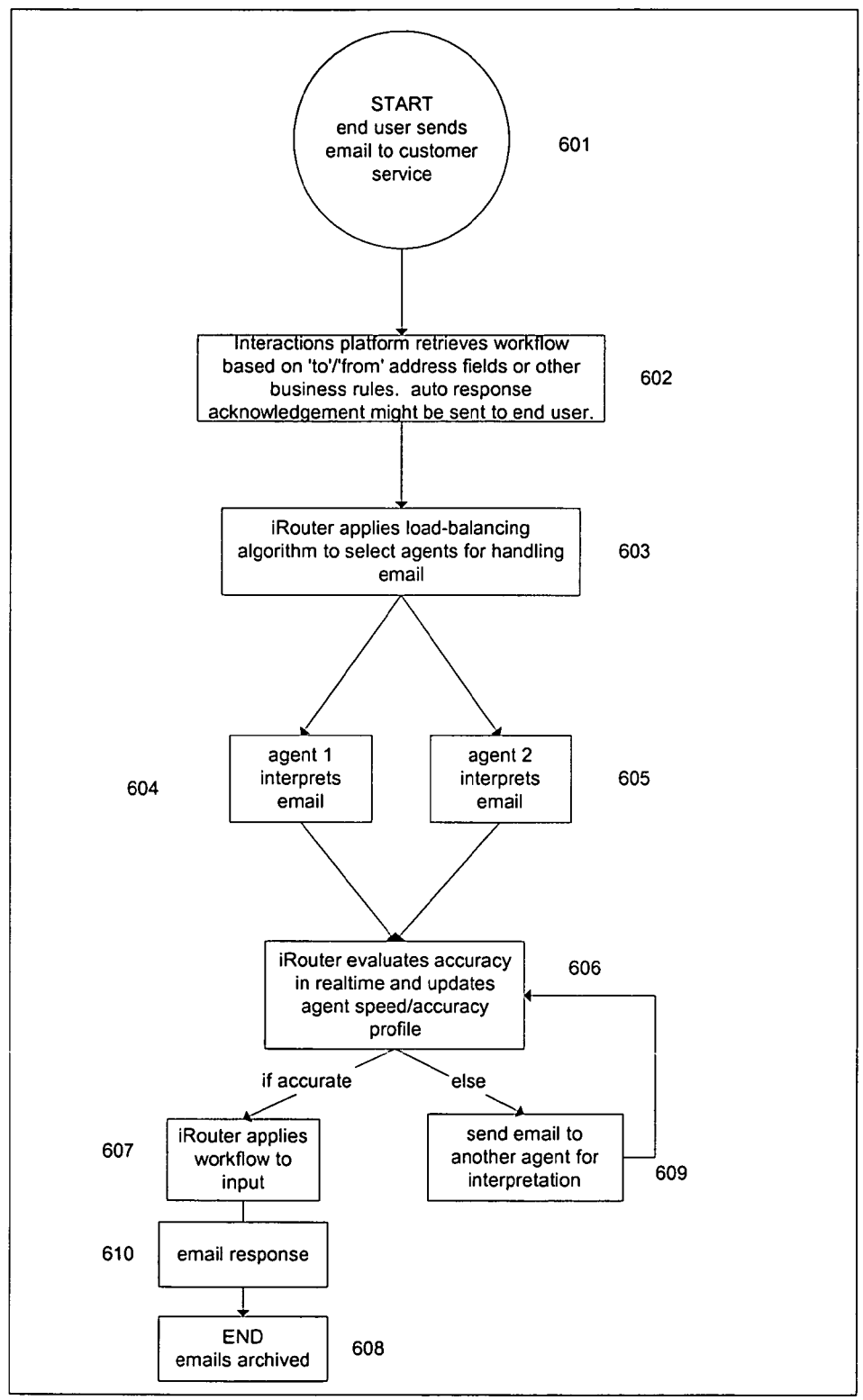
FIG. 6 is a flow chart of processing an email in the context of an interactive response system in accordance with another aspect of this system.

FIG. 6 illustrates an example of how information is retrieved and handled by the interactive response system when a customer internets via electronic mail (email, as it is commonly known in the art). As shown in block 601, the interaction begins with the customer emailing to the customer service email address of a company. The interactions platform, a gateway server, in this exemplary embodiment opens the email and retrieves the appropriate workflow stored in the workflow database based on either (1) the to/from information of the customer or (2) other business rules, as illustrated at 602. The gateway server then sends the appropriate response acknowledgement as illustrated at 602. Then the iRouter identifies available human agent(s) to handle the email by applying a load balancing algorithm, triggers a pop-up on their screens to show possible intents for interpretation, and sends the email content to the or those human agents, as shown at block 603. The human agent(s) interpret the email as shown in blocks 604 and 605. After test 606, where the iRouter evaluates the accuracy, in real time, of the customer email interpretation and updates each agent's speed/accuracy profile, the iRouter processes the interpretation and performs the next steps in the workflow accordingly. Eventually, the iRouter forwards an appropriate email response to the customer through the gateway server (if the interpretation is deemed accurate) as seen in block 607. The emails are then archived in the appropriate database as illustrated in block 608. If the interpretation is deemed inaccurate, the iRouter sends the email to another human agent for another interpretation (block 609) and then reevaluates its accuracy. The iRouter manages interaction with the customer through email responses, using the workflow as its guide.

Other features of the present system include a seamless blend of speech recognition software and human agent interaction to provide added customer privacy and security such that human access to confidential customer data is minimised. In a customer contact center environment, customer personal data, such as credit card information, social security numbers and address, is routinely made available to human agents interacting with customers. The present system uses a software-based front-end that incorporates speech recognition technology to allow a computer to capture, verify, or update a customer's sensitive data. The software manages the customer interaction so that confidential data is stored in a database and not passed to any human agent. The software can stream audio clips of the customer's utterances over a TCP/IP network to client software being used by agents anytime human intervention is required. In cases where the workflow does require that a human agent handle sensitive customer information, the transaction is portioned into discrete, logical units allows business analysts to engineer the process so that the same human agent never sees more than one element of a given set of customer data. For example, if two agents see a particular customer's credit card number, two different agents see the customer's name. No one agent sees a full record or profile for a given customer. This helps call center operations, which often experience high agent turnover, minimize the problem of identify theft.

Other features of some embodiments of the present system include interactions platform 102 optionally accommodating still pictures in any format (e.g., jpeg, tiff), motion pictures, scanned data, facsimiles, web pages, etc., which can be forwarded to a human agent's station. Such facility is useful, for example, for monitoring alarms, parsing faxes, etc. The human agent's interpretation is then delivered to the iRouter in the context of the workflow, as above.

It will be understood that the foregoing is only illustrative of the principles of the disclosed systems and that various modifications can be made by those skilled in the art without departing form the scope of the invention, which is limited only by the claims.

What is claimed is:

1. A computer-implemented method for operating an interactive response system comprising:

receiving data representing a multi-utterance transaction with a person, the data having multiple elements, a subset of the elements including sensitive customer data;

portioning the multi-utterance transaction into discrete, logical utterance units;

automatically presenting the utterance units in perceptible form through a routing device and an analyst interface to each of a number of intent analysts, the utterance units being distributed so that no intent analyst is ever exposed to more than one of said subset of the elements including sensitive customer data;

accepting intent input from each intent analyst through the respective analyst user interface, where the intent input comprises a selection, from a list of choices, of a most-correct interpretation of the person's intent expressed in a corresponding one of the utterance units; and using a processor, automatically communicating a message to the person, in perceptible form and in substantially real time relative to the receiving step, the message being automatically selected from among a predetermined set of possible messages as a function of the intent input accepted from the intent analysts.

2. The method of claim 1, wherein the multi-utterance transaction comprises audio.

3. The method of claim 2, wherein the multi-utterance transaction is received through a telephone system.

4. The method of claim 1, wherein the multi-utterance transaction comprises video.

5. The method of claim 1, wherein the multi-utterance transaction comprises text.

6. A system for processing an interaction with a person, comprising a processor, two or more analyst user interface devices in communication with the processor, and a memory in communication with the processor, the memory storing programming instructions executable by the processor to:
receive data representing a multi-utterance transaction with the person, the data having multiple elements, a subset of the elements including sensitive customer data;
portion the multi-utterance transaction into discrete, logical utterance units;
automatically present the utterance units in perceptible form through the analyst interface devices to a number of intent analysts, the utterance units being distributed so that no intent analyst is ever exposed to more than one of said subset of the elements including sensitive customer data;
accept intent input from each intent analyst through the respective analyst user interface device, where the intent input comprises a selection, from a list of choices, of a most-correct interpretation of the person's intent expressed in a corresponding one of the utterance units, and where the intent input is prevented from providing information to be communicated to the person; and
automatically communicate a message to the person, in perceptible form and in substantially real time relative to the receiving function, the message being automatically selected from among a predetermined set of possible messages as a function of the intent input accepted from the two or more intent analysts.

7. The system of claim 6, wherein the multi-utterance transaction comprises audio.

8. The system of claim 7, wherein the multi-utterance transaction is received from the person through a telephone system.

9. The system of claim 6, wherein the multi-utterance transaction comprises video.

10. The system of claim 6, wherein the multi-utterance transaction comprises text.

11. The system of claim 6, wherein the programming instructions are further executable by the processor to accept data input from each intent analyst through the respective analyst user interface device, and where the data input characterizes the intent analyst's transcription of data expressed by the person in one of the utterance units.

12. A system for managing interactions with a person, comprising a processor and a memory in communication with the processor, the memory storing programming instructions executable by the processor to:
receive data representing multi-utterance transaction with the person, the data having multiple elements, a subset of the elements including sensitive customer data;
portion the multi-utterance transaction into discrete, logical utterance units;
automatically send the utterance units to two or more intent analyst user interface devices, each user interface device being configured to reproduce the utterance in a form perceptible to an intent analyst, the utterance units being distributed so that no intent analyst is ever exposed to more than one of said subset of the elements including sensitive customer data;
receive intent input from each intent analyst user interface device, where the intent input comprises a selection, from a list of choices, of a most-correct interpretation of the person's intent expressed in a corresponding one of the utterance units; and
automatically communicate a message to the person in perceptible form and in substantially real time relative to the receiving function, the message being automatically selected from among a predetermined set of possible messages as a function of the intent input received from the two or more intent analyst user interface devices.

13. The system of claim 12, wherein the multi-utterance transaction comprises audio.

14. The system of claim 13, wherein the multi-utterance transaction is received from the person through a telephone system.

15. The system of claim 12, wherein the multi-utterance transaction comprises video.

16. The system of claim 12, wherein the multi-utterance transaction comprises text.

17. The system of claim 12, wherein the programming instructions are further executable by the processor to accept data input from each intent analyst through the respective analyst user interface device, and where the data input characterizes data expressed by the person in one of the utterance units.

* * * * *